R. R. RAMEY.
INTERNAL BRAKE FOR DRUMS OF AUTOS.
APPLICATION FILED DEC. 23, 1916.
1,250,656.
Patented Dec. 18, 1917.
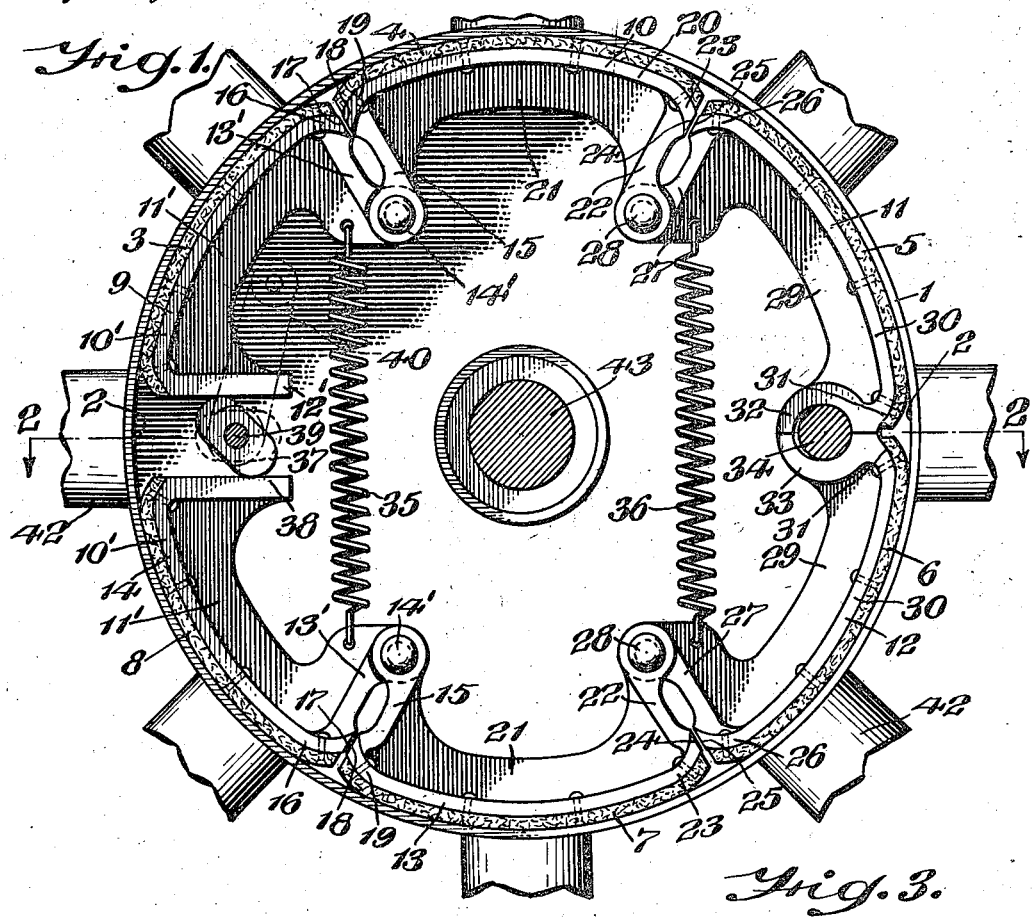
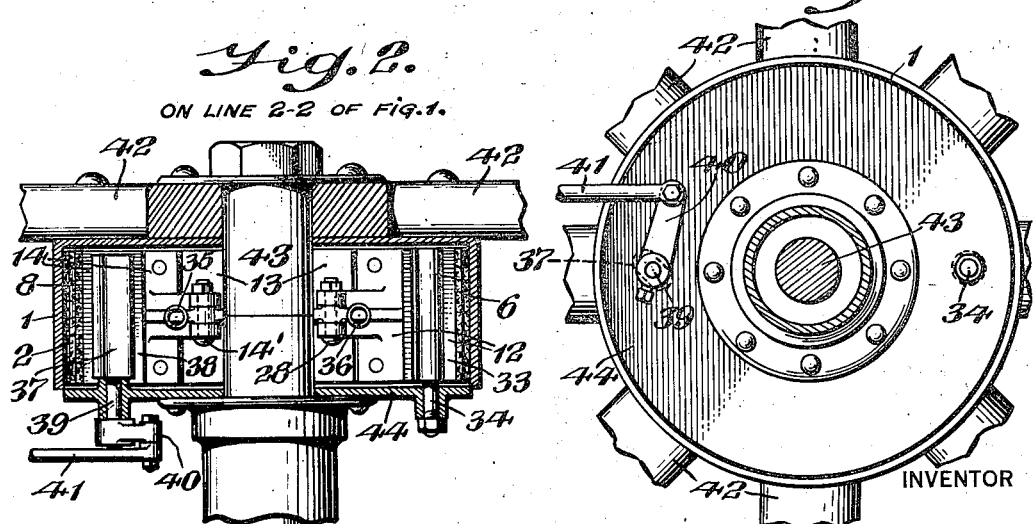
INVENTOR
Robert R. Ramey
BY Hedesheim Fairbanks
ATTORNEYS

UNITED STATES PATENT OFFICE.

ROBERT R. RAMEY, OF PHILADELPHIA, PENNSYLVANIA.

INTERNAL BRAKE FOR DRUMS OF AUTOS.

1,250,656.  Specification of Letters Patent.  Patented Dec. 18, 1917.

Application filed December 23, 1916. Serial No. 138,533.

*To all whom it may concern:*

Be it known that I, ROBERT R. RAMEY, a citizen of the United States, residing in the city and county of Philadelphia, State of Pennsylvania, have invented a new and useful Internal Brake for Drums of Autos, of which the following is a specification.

My invention relates to a novel construction of a brake, which is particularly designed for employment with the internal periphery of the brake drum, the latter being adapted to be acted upon by a plurality of displaceable or expansible members, preferably six in number, which are so correlated with respect to the brake drum and to each other that on the operation of a suitable expanding device, the brake members will be expanded or operated so as to gradually and powerfully distribute and equalize the frictional contact between the brake shoes and the inner periphery of said drum in such a way that neither the brake mechanism nor the drum or wheel or running gear will be subjected to undue stresses and strains caused by the sudden and uneven application of the braking elements or shoes, since I preferably employ a plurality of shoes arranged to be simultaneously brought into action without undue wear upon any particular part of the driven or revoluble element.

To the above ends my invention consists of a novel construction of internal braking mechanism, comprising brake shoes of segmental construction, which are preferably provided with radial inwardly extending arms, which are pivotally secured together in such a manner that when the braking shoes or segments are contracted, suitable abutments are provided which tend at the proper period to limit the contracting movement of the braking segments, said segments being adapted to be substantially in contact end to end when the brake is contracted or off and separated when the brake is off.

It further consists of other novel features of construction, all as will be hereinafter fully set forth.

For the purpose of illustrating my invention, I have shown in the accompanying drawing one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of an internal brake for the drums of automobiles, trucks and other vehicles, embodying my invention.

Fig. 2 represents on a reduced scale a section on line 2—2 Fig. 1.

Fig. 3 represents a side elevation partly in section of Fig. 2.

Similar numerals of reference indicate corresponding parts in the figures.

Referring to the drawings—

1 designates a brake drum against whose inner periphery 2 contacts the friction strips 3, 4, 5, 6, 7 and 8 of the brake shoes or segments 9, 10, 11, 12, 13 and 14, respectively, whose construction will be apparent from Fig. 1.

The brake shoes 9 to 14 are of segmental construction, the shoes 9 and 14 being substantial duplicates as are the shoes 10 and 13, and 11 and 12, so that a description of one of each pair of brake shoes will suffice for all.

The brake shoe 9 is composed of the rim member 10', having the body portion 11' and the laterally inwardly extending flange 12', while at the end opposite to said flange 12' is located the radial arm 13', which is pivoted or fulcrumed at 14' to the radial arm 15 of the brake segment 10. The rim 10' is inwardly deflected at 16 and provided with the wall 17, which is juxtaposed to the wall 18 of the inwardly deflected portion 19 of the rim member 20, which is provided with the body portion 21 and the inwardly extending radial arm 22. The rim portion 20 is inwardly deflected at 23, and provided with the wall 24, which is juxtaposed to the wall 25 of the inwardly deflected rim portion 26 of the sleeve or segment 11, the latter being provided with a radial arm 27, which is pivotally connected to the radial arm 22 at 28.

29 designates the body portion of the segment 11, which is provided with the rim 30 and the inwardly turned rim portion 31 and the bearing 32, which in conjunction with the bearing 33 forms a cylindrical opening or seat for the pivot pin 34.

It will thus be seen that the three upper segmental sections or brake shoes, while each of different construction are so collocated and pivotally connected, that they operate in unison, and the construction of the three lower or opposite segmental sections or brake shoes in the lower half of Fig. 1 are substantially identical with the three segmental sections above described.

For a further explanation of the device involving in the present case two series of shoes each of three articularly jointed shoe members, I will describe each series of members as left, right, and intermediate or middle, so that when the left hand shoe is operated by the cam and so is spread out, it quickly operates the middle shoe, and the latter quickly operates the right hand shoe, and so the several shoes move out and act as one with uniform friction and pressure on the inner periphery of the drum.

35 designates a spring common to the oppositely located arms 13′ of the segmental brake sections 9 to 14, while the spring 36 is common to the arms 27 of the sections 11 and 12, as will be understood from Fig. 1. The brake segments are simultaneously expanded by the rotation or actuation of the cam member 37, which has its cam surfaces bearing on the laterally extending flanges 12′ and 38 of the sections 9 and 14, said cam 37 being actuated in any suitable manner but being shown in the present instance as being mounted on the rod 39, which is provided with the rock arm or link 40, to which is attached the rod 41 which may lead to a foot pedal or lever under the control of the chauffeur or operator of the automobile or other vehicle.

It will be understood that the drum 1 may be secured or mounted with respect to the wheel 42 on the hub or axle 43 thereof in any suitable manner, and that the pin or bolt 34 as well as the rod 39 may be mounted or supported with respect to the closure or disk 44 and the latter mounted on the hub 43 in any approved or conventional manner, as will be evident to those skilled in the art, my invention being directed particularly to the novel collocation and construction of the plurality of segmental brake sections above described.

The operation is as follows:—

As it will be understood by those skilled in the art, the brake drum 1 is attached to the wheel or spokes 42 in such a manner as to rotate in unison therewith, the brake sections 9, 10, 11, 12, 13 and 14 being non-rotatable with respect to the brake drum 1.

When it is desired to apply the brake, the operator through the medium of the brake rod 41 or equivalent device actuates the cam member 37, whereupon the brake sections 9, 10, 11, 12, 13 and 14 are simultaneously expanded against the tension of the springs 35 and 36 until the juxtaposed faces or walls 17, 18, 24 and 25 tend to move substantially out of contact, until further expansion against the periphery 2 is prevented. The expansion of the brake sections brings the friction strips 3, 4, 5, 6, 7 and 8 against the inner periphery 2 of the drum 1 and the brake then becomes effective or is on, it being necessary in order to release the brake sections for the operator to merely actuate the rod 41 and the cam member 37 in the opposite direction, whereupon the tension of the springs 35 and 36 will pull the coacting brake sections inwardly and the brake is then off, the parts 17 and 18, and 24 and 25 now abutting.

It will be seen from the foregoing that by the novel construction of my brake mechanism, the same will be particularly applicable not only for heavy vehicles, as trucks and drays, but for automobiles, self-propelled and other vehicles, which are lighter in weight, and it will be not only strong and durable, but powerful in operation, and will be capable of being readily thrown into and out of operation, and is further provided with frictional contact and wearing surfaces of the proper area relative to the dimensions of the inner periphery of the brake drum.

It will be seen also that in my invention a plurality of brake sections are provided, which are so correlated that they will afford substantially a complete circumferential frictional contact with the inner periphery of the brake drum when the brake is in operation or on, and that furthermore by reason of the employment of a multiplicity of braking members constructed and correlated as I have described, there is greater equalization of the braking action of said members not only in point of wear but there is also an equal pressure imparted, so that not only is the life of the braking apparatus prolonged, but there is in addition when the brake is on, an absence of the jerky motion frequently communicated to a vehicle which is liable to exist where a lesser number of brake sections are employed. Attention is drawn furthermore to the fact that when the cam 37 is operated to cause the operation of the brake the first shoes of the upper and lower sections in the present case at the left, are forced around in circular direction. Then the radial arms of said shoes abut against the radial arms of the middle sections. Then the radial arms of the latter bear against the radial arms of the right hand shoes, and so the several shoes of each series above and below become rigid in their relation to each other and turn as one on the pivot pin 34 and form an unbroken uniform circular surface which contacts throughout against the brake.

When the cam is rotated in the reverse direction to release the shoes, the springs 35 and 36 become operative to draw both the right and left shoes of the upper and lower sections toward each other. Then said right and left shoes carry the middle sections with them, while the radial arms of each right, left and middle section abut, causing the several shoes of both the upper and lower sections to be rigid as one turning on the pivot pin 34, whereby the several shoes of each section preserve an unbroken circular surface so that the right, left and middle shoes of both sections simultaneously recede from the drum 1 thereby clear entirely said drum and avoid any grinding or irregularity of either section of the articulated or jointed shoes.

It will be apparent that I have devised a novel and useful construction of an internal brake for drums of autos which embodies the features of advantage enumerated as desirable in the statement of the invention and the above description, and while I have, in the present instance, shown and described preferred embodiments thereof which will give in practice satisfactory and reliable results, it is to be understood that the same are susceptible of modifications in various particulars without departing from the spirit or scope of the invention or sacrificing any of its advantages.

It will be clearly understood from the foregoing, that when the cam member 37 is actuated to the proper extent, the springs 35 and 36 will exert a pull inwardly upon the members to which they are attached, which pull will not only instantly release the brake segments, but will, in addition, cause the shoulders or parts 17 and 18, and 24 and 25, to abut, thus affording a predetermined limit to the inward movement or the releasing of the brake sections, which is an important feature in my invention.

Having thus described my invention, what I claim as new and desire to secure by Letters Patent, is:—

1. In a brake device of the character stated, a drum, a plurality of segmental pivotally connected brake shoes arranged in upper and lower groups within said drum, a pivot pin connecting the groups, radial arms on the terminals of adjacent shoes, said arms being adapted to abut, and means for actuating the shoes for causing them to engage the drum.

2. In a brake device of the character stated, the combination of a brake drum, a plurality of internal segmental brake shoes arranged in upper and lower groups and a pivot pin connecting the groups, the upper and lower central segmental brake shoes being provided with radial inwardly extending arms, the latter having walls adapted to abut against the juxtaposed walls of radial, inwardly projecting arms of the contiguous brake shoes, tension devices adapted to normally hold said segmental brake shoes out of contact with said brake drum, and means for actuating the shoes for causing them to engage the drum.

3. An internal brake, comprising a drum, an upper group of segmental shoes, arranged in series and pivotally connected to each other, a lower group of similar segmental shoes, a pivot pin connecting adjacent members of each series of shoes, the ends of the groups opposite to said pivot pin being separated, a cam member located between the separated ends for actuating the groups, inwardly-extending radial arms on the members of each group, the same being adapted to abut, and tension devices connected with the right and left members of each group adapted to hold said members and the intermediate member out of contact with the drum of the brake.

4. An internal brake comprising an upper group of segmental shoes, the adjacent members of each series of which are pivotally connected, a lower group of similar segmental shoes, the members of which are articularly connected, a pivot pin connecting the groups, a cam member located between the free ends of the groups, radial arms on the terminals of the shoes, one arm of each shoe being adapted to abut the arm of the contiguous shoe, and a pair of springs adapted to hold the groups out of contact with the drum of the brake, said springs being common respectively to the end members of the opposite groups.

5. In a brake, a drum, a group of cam-actuated segmental shoes, a group of oppositely located segmental brake shoes, pivotal connections for the members of each group of shoes, a pivotal connection for the opposite group of shoes, a cam-like member at the free ends of said groups for causing the latter to engage said drum, and radial arms on the terminals of the members of the groups, the same being adapted to abut when the groups are operated.

ROBERT R. RAMEY.

Witnesses:
E. HAYWARD FAIRBANKS,
C. D. McVAY.